United States Patent [19]
Yutaka

[11] Patent Number: 5,347,621
[45] Date of Patent: Sep. 13, 1994

[54] METHOD AND APPARATUS FOR PROCESSING IMAGE DATA

[75] Inventor: Teiji Yutaka, Tokyo, Japan

[73] Assignee: Sony Corporation, Tokyo, Japan

[21] Appl. No.: 760,063

[22] Filed: Sep. 13, 1991

[30] Foreign Application Priority Data

Sep. 19, 1990 [JP] Japan ............................ 2-249705
Sep. 21, 1990 [JP] Japan ............................ 2-252230

[51] Int. Cl.$^5$ ............................................. G06K 1/00
[52] U.S. Cl. ...................................... 395/131; 395/164
[58] Field of Search .............. 395/162, 163, 164, 165, 395/166, 131; 340/703; 358/76, 80; 345/150, 153

[56] References Cited

U.S. PATENT DOCUMENTS

| 4,777,621 | 10/1988 | Miner et al. | 364/900 |
|---|---|---|---|
| 4,847,604 | 7/1989 | Doyle | 340/706 |
| 5,091,720 | 2/1992 | Wood | 340/721 |
| 5,103,407 | 4/1992 | Gabor | 395/131 |
| 5,142,615 | 8/1992 | Levesque et al. | 395/131 |
| 5,241,658 | 8/1993 | Masterson et al. | 395/162 |

FOREIGN PATENT DOCUMENTS

279226 1/1988 European Pat. Off. .
413483 8/1990 European Pat. Off. .

Primary Examiner—Phu K. Nguyen
Attorney, Agent, or Firm—Lewis H. Eslinger; Jay H. Maioli

[57] ABSTRACT

Image data is processed by dividing an entire screen into a predetermined number of unitary blocks of pixels, then storing data of the divided screen blocks from an image data recording medium into memories, and processing the data for displaying the image on a predetermined display means. Out of the entire data of the divided screen blocks, the data of some blocks usable in common for the screens and the data of the other divided screen blocks are sequentlly read from the recording medium and are stored in the memories. The kinds of the color data usable for the entire screen are limited in accordance with the kinds of colors usable for each of the divided screen blocks, and the color data usable for each of the divided screen blocks is selected out of the limited color data usable for the entire screen, so as to display a satisfactory image in which boundaries between the divided screen blocks are not conspicuous.

6 Claims, 6 Drawing Sheets

FIG. 3

| 16-COLOR DATA IN 1ST PALETTE |
|---|
| 16-COLOR DATA IN 2ND PALETTE |
| 16-COLOR DATA IN 3RD PALETTE |
| ⋮ |
| 16-COLOR DATA IN 8TH PALETTE |

FIG. 4

| COLOR NO. | RED | GREEN | BLUE |
|---|---|---|---|
| 0 0 0 0 | x x x x x | x x x x x | x x x x x |
| 0 0 0 1 | x x x x x | x x x x x | x x x x x |
| 0 0 1 0 | x x x x x | x x x x x | x x x x x |
| ⋮ | ⋮ | ⋮ | ⋮ |
| 1 1 1 1 | x x x x x | x x x x x | x x x x x |

FIG. 5

| CHARACTER CODE | PALETTE NO. |
|---|---|
| 0 0 0 0 0 0 0 0 0 | X X X |
| 0 0 0 0 0 0 0 0 1 | X X X |
| 0 0 0 0 0 0 0 1 0 | X X X |
| ⋮ | ⋮ |
| 1 0 1 1 1 1 1 1 1 | X X X |

FIG. 6

| PIXEL NO. | COLOR NO. |
|---|---|
| 0 0 0 0 0 0 | X X X X |
| 0 0 0 0 0 1 | X X X X |
| 0 0 0 0 1 0 | X X X X |
| ⋮ | ⋮ |
| 1 1 1 1 1 1 | X X X X |

METHOD AND APPARATUS FOR PROCESSING IMAGE DATA

BACKGROUND OF THE INVENTION

1. Field of the Invention

The present invention relates to a method and an apparatus for processing image data based particularly on a bit map format.

2. Description of the Prior Art

There has been known heretofore that, when image data inclusive of video signals are processed after being once stored in a memory, an entire screen is divided into a plurality of blocks and the data are processed with regard to each of the divided blocks. Since the data processing is executed for the individual blocks, it becomes possible to reduce the amount of the data to be processed each time, hence minimizing the burden imposed on an image data processing circuit and so forth.

It is customary that, when various image data such as video signals are stored in the memory, data representative of color or the like is added to the image data for each of pixels constituting one screen, and the data of the entire pixels of one screen including the attributes of color data are stored in the memory. The data thus obtained by dividing one screen into component pixels is termed bit-map image data.

However, in such data processing for the divided screen blocks, there exists a disadvantage that the boundaries between the divided blocks are prone to conspicuous in the displayed image because of color differences. More specifically, when divided images are displayed in mutual proximity, there arises a problem that the display colors are rendered different from each other on both sides of the boundary between the divided blocks. And the boundary of such color tone variations is discerned as the boundary of the divided blocks.

In bit-map image data, color data and so forth are needed with regard to all pixels constituting one screen, so that the data required for one screen becomes great in amount to consequently increase the amount of the data processed by an image display circuit, hence raising a disadvantage of a great burden imposed on the processing circuit. More specifically, in the circuit for processing the image data to display the same, it is necessary to perform operations of first reading out the image data from a recording medium such as a disc or tape, then storing the image data once in a RAM included in the processing circuit and subsequently converting the data into video signals or the like to be displayed. However, the RAM incorporated in the processing circuit requires a great storage capacity to eventually enlarge the circuit scale.

OBJECTS AND SUMMARY OF THE INVENTION

It is a first object of the present invention to provide an improved method which eliminates the problem that the boundary between the divided blocks of the displayed image is conspicuous.

And a second object of the present invention resides in providing an improved apparatus where a circuit for processing bit-map image data is simplified.

The method of the present invention processes image data by dividing an entire screen into a predetermined number of unitary blocks of pixels, and then setting predetermined kinds of color data usable for each of the divided screen blocks. The process is executed by limiting the kinds of the color data usable for the entire screen in accordance with the kinds of color data usable for each of the divided screen blocks, and selecting the color data usable for each of the divided screen blocks in accordance with the limited color data usable for the entire screen.

Due to such contrivance, common colors are made readily usable for the divided screen blocks so that, when some colors of the same series are used for the divided screen blocks, the same color is selected and therefore any change of the color tones is preventable at the boundary between the divided screen blocks to consequently render the boundary inconspicuous.

Meanwhile in the apparatus of the present invention, out of the entire data of the divided screen blocks, the data usable in common for the screens are read from a recording medium and are stored first in memories, and the specific data for displaying the divided screen blocks are sequentially read from the recording medium and then are stored in the memories.

Owing to the constitution mentioned, there exists no necessity of sequentially storing the data, which are usable in common for individual screens, in the signal processing memories at each change of the displayed images, hence reducing the amount of the data to be transferred to and stored in such memories, to eventually diminish the burden imposed on the processing circuits.

The above and other features and advantages of the present invention will become apparent from the following description which will be given with reference to the illustrative accompanying drawings.

DESCRIPTION OF THE PREFERRED EMBODIMENTS

Hereinafter the image data processing method of the present invention will be described in detail with reference to a preferred embodiment shown in the accompanying drawings.

Figure 1:
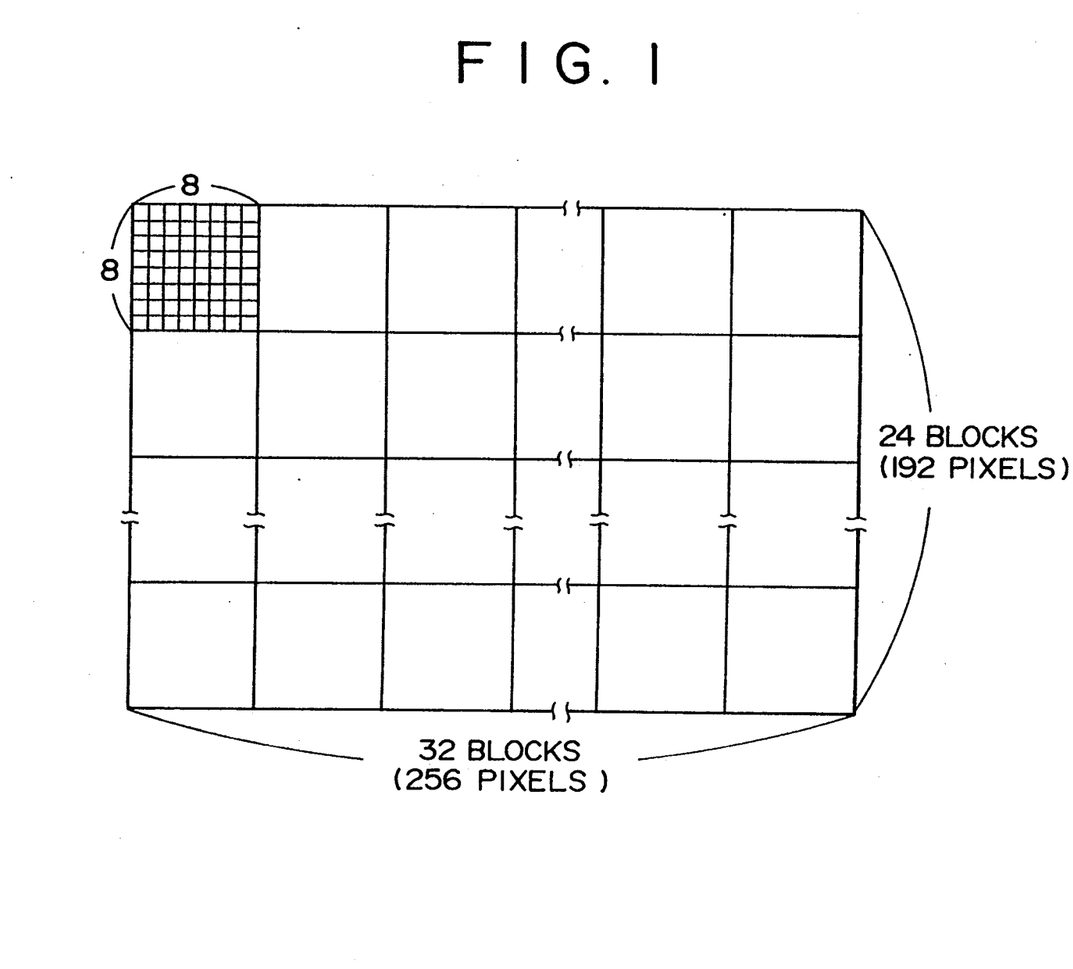
FIGS. 1, 3, 4, 5, 6 and 7 are schematic diagrams illustrating how the image processing is performed by the embodiment.

In this embodiment, video signals of a still picture or the like are processed to be image data of a paletted bit map format. Therefore a description will first be given with regard to such image data of a paletted bit map format. Bit-map image data is obtained by dividing video signals of a single still picture into a plurality of blocks. As shown in FIG. 1 for example, video signals of a screen composed of 256 horizontal pixels and 192 vertical pixels are divided into a total of 768 blocks (32 horizontal blocks × 24 vertical blocks) where 64 (8 × 8) pixels constitute each block. In this example, each block is referred to as one character in the following description.

Usable color data are set with respect to the individual characters. In this embodiment, the color data are composed of palette data, of which 8 kinds are prepared for each image. And 16 kinds of arranged red, green and blue color data are stored as each kind of the palette data, and further color numbers from 1 to 16 are given thereto.

Data signifying which of such 8 kinds of data is used (hereinafter referred to as screen data) are set with regard to 768 characters constituting one screen, so that the palette used for each character is determined by the screen data.

In the stored character data representing the pixel data of each character, there is set the data of one color number (out of 1 through 16) per pixel. Therefore the color of each pixel is determined with reference to the arranged color data representative of the color number in the palette assigned to the relevant character.

Due to the paletted bit-map image data, the entire screen is expressed in 128 colors (16 colors×8 palettes) so that a maximum of 128 colors are rendered usable for each screen, and still the requirement can be met merely by giving color numbers 1 through 16 with regard to the unitary pixels, hence realizing a wide reduction in the amount of the data of the entire screen.

Figure 2:
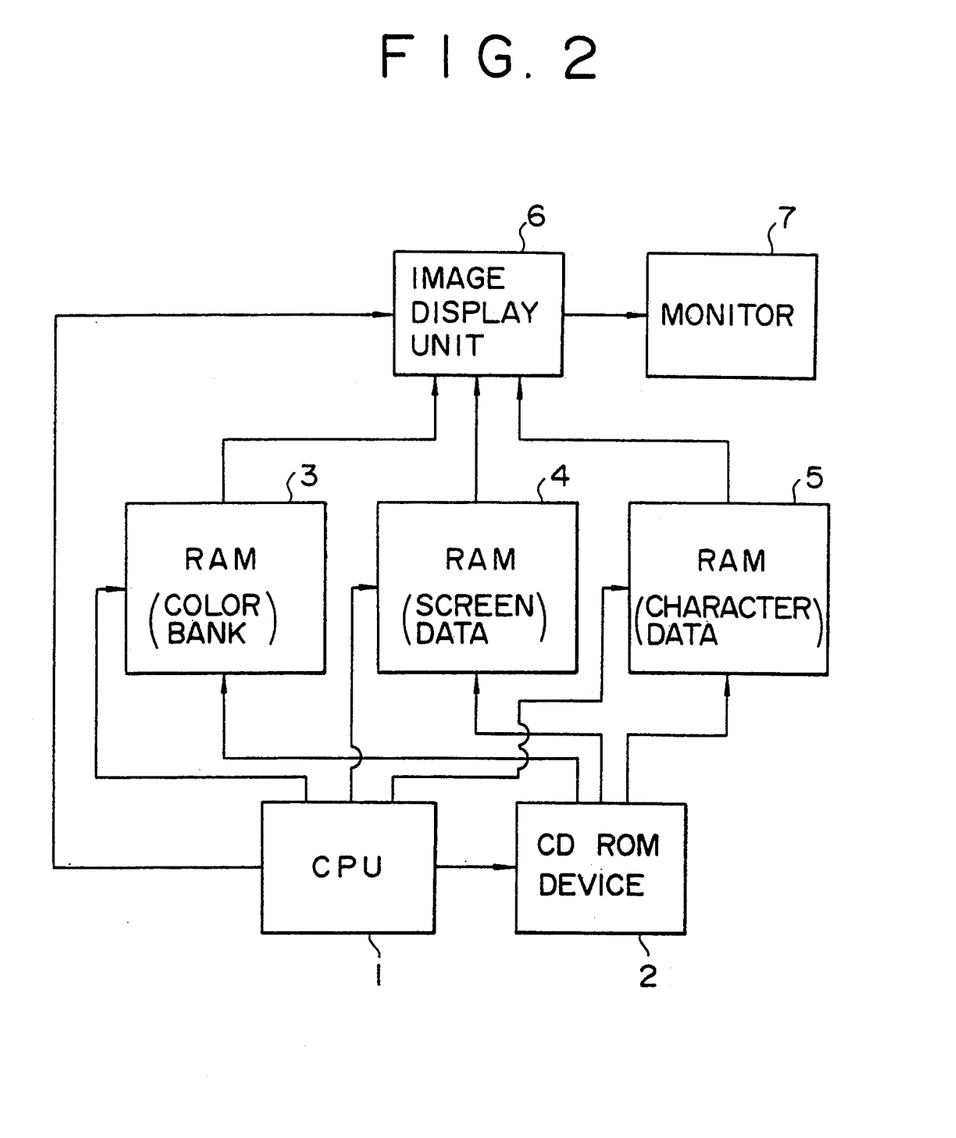
FIG. 2 is a block diagram of a system for applying an exemplary embodiment of the present invention.

FIG. 2 shows an exemplary constitution for displaying image data of such paletted bit map, wherein a reference numeral 1 denotes a central processing unit (CPU) for controlling the image display. Under control of the CPU 1, data of a predetermined image are read out from a disc (CD ROM) loaded in a CD ROM device 2 and then are once stored in RAMs 3, 4, 5. In this embodiment, a group of memories are divided into first, second and third areas, and such three areas are used respectively as RAMs 3, 4, 5. And 8 kinds of palette data are stored in the first area used as the RAM 3; screen data of the palettes corresponding to the characters are stored in the second area used as the RAM 4; and character data representing the color number of the individual pixels in the characters are stored in the third area used as the RAM 5.

Figure 3:
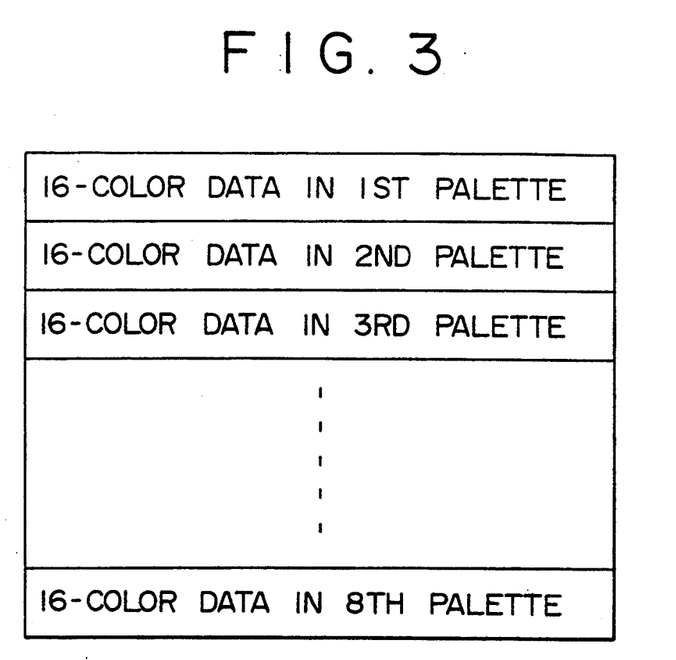
Figure 4:
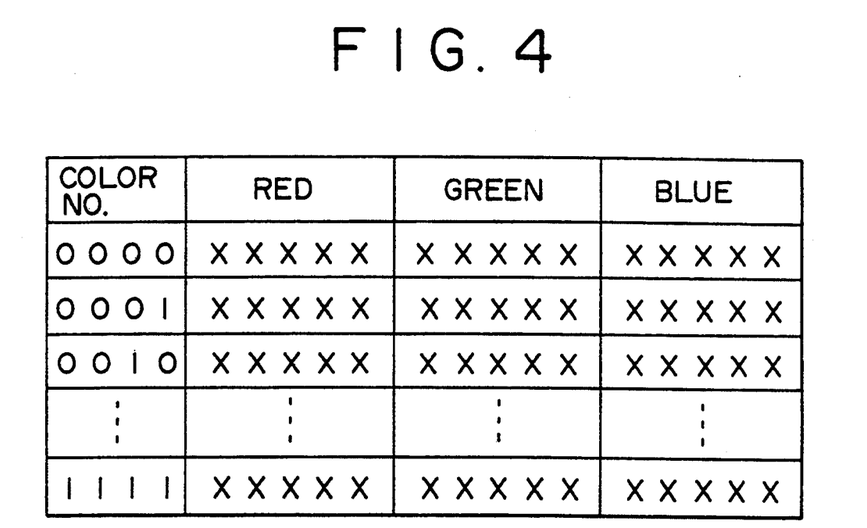

FIGS. 3 and 4 show the storage states of the palette data in the RAM 3. The RAM 3 for storing the palette data is termed a color bank where, as shown in FIG. 3, respective 16-color data of the palettes from the 1st to the 8th are stored in individual areas. And in the 16-color data of each palette, as shown in FIG. 4, 16 color numbers are set respectively with 4-bit data, and 5-bit level data of R (red), G (green) and B (blue) colors are set with regard to each of the color numbers.

Figure 5:
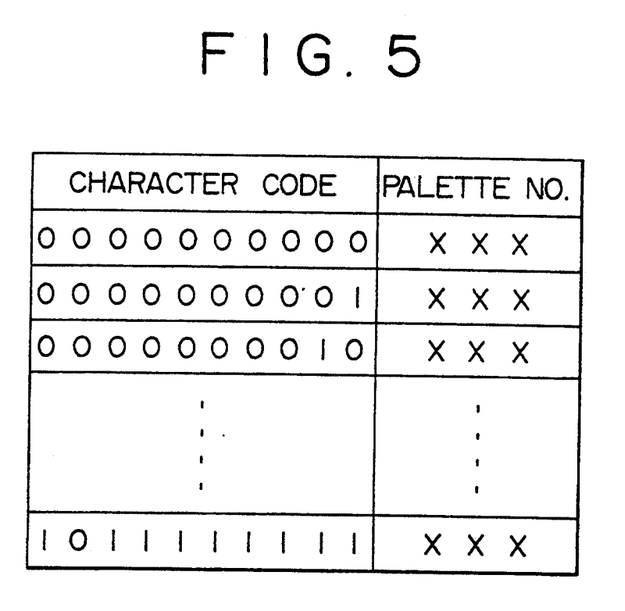

FIG. 5 shows an exemplary storage state of screen data in the RAM 4, wherein character codes for designating the characters of 768 blocks respectively are each composed of 10 bits, and the number of each palette corresponding to the individual character data is set-table with 3 bits.

Figure 6:
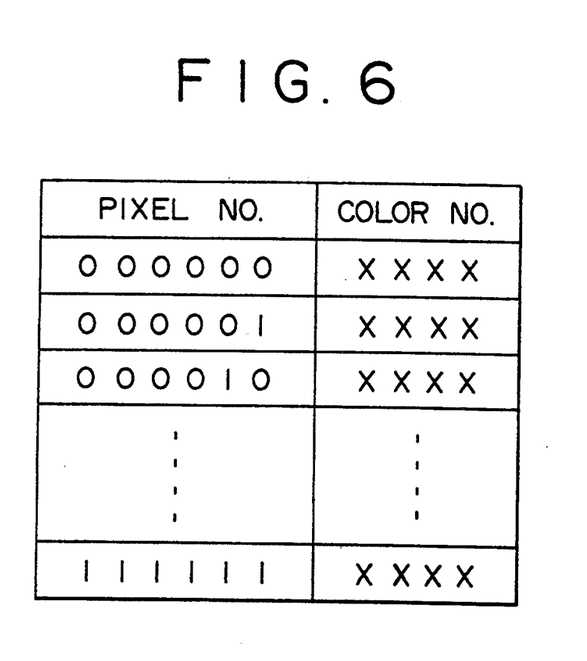

FIG. 6 shows an exemplary storage state of character data in the RAM 5, illustrating here merely a storage area for the data of one character alone. In the storage areas for the characters, pixel numbers corresponding to 64 pixels of one character are each composed of 6 bits, and a 4-bit color number is settable for each of the pixel numbers.

Under control of the CPU 1, the color number data for the pixels are read out and supplied individually from the RAM 5 to an image display unit 6, and the palette data corresponding thereto are read out from the RAM 3 in accordance with the screen data stored in the RAM 4, whereby each pixel is colored. And upon completion of coloring the entire pixels of one screen on the image display unit 6, horizontal and vertical synchronizing signals are added to the data of one screen to produce predetermined video signals, which are then supplied to a monitor 7 so as to be displayed on its screen.

In the present invention, the following operation is further performed to render inconspicuous the boundary between the divided blocks in the display screen.

At the time of producing paletted bit-map image data, first a process is executed to determine the colors usable for one entire image. More specifically, colors usable for one entire image are limited to, e.g., 48 kinds which are three times the 16 kinds settable with one palette, and in case the colors constituting one original image is in excess of 48 kinds, any colors of the same series are regarded as the same color and are replaced with some other color so that a total of the colors are within 48. Then 16-color data required for each character is properly selected out of such 48 colors to prepare 8 kinds of combinations which are each defined as a palette, and 8 kinds of palette data are produced therefrom. The number of colors usable in each character is limited to 16 or less, and a combination of such limited colors is set as one palette. Thus the palette to be used for each character is set in accordance with the screen data, and color number data corresponding to the pixels in the character are added to produce paletted bit-map image data. In this case, the image data thus obtained are recorded on a disc (CD ROM) loaded in the CD ROM device 2.

Consequently, in the image displayed on the screen of the monitor 7 in accordance with the image data read out from the CD ROM device 2, the colors used in the characters are made mutually common to render the intercharacter boundaries less conspicuous. More specifically, in comparison with the original image where a maximum of 128 colors (16 colors per palette×8 palettes) are usable for one entire screen, the colors are limited to 48 so that the usable colors are so processed as to be mutually common among the characters. Therefore, in case an image of a human face for example is displayed astride a plurality of characters, the displayed face is expressed exactly in the same color over the relevant characters if merely one kind of flesh color is set in the palettes, hence preventing an undesired phenomenon that the flesh color of the face delicately changes in the individual characters. Thus, due to the progress in the common use of colors for the characters, it becomes possible to prevent conspicuous changes of color tones at the boundaries among the characters, whereby the boundaries are hardly discerned on the displayed image to consequently improve the continuity of the image at the boundaries of the characters. In this case, the process to render the intercharacter boundaries less conspicuous is executed at the time of producing the paletted bit-map image data, so that such image data is displayed while no burden is imposed on any circuit of the CPU 1, the image display unit 6 and so forth.

Although in the above embodiment the number of usable colors is limited to 48 kinds which are three times the 16 colors per palette, it is obvious that, if the usable number is limited to be several times the number per palette, the colors are made mutually common among the characters to consequently render the intercharacter boundaries less conspicuous.

For the purpose of simplifying the circuit to process the bit-map image data, the following is contrived.

Figure 7:
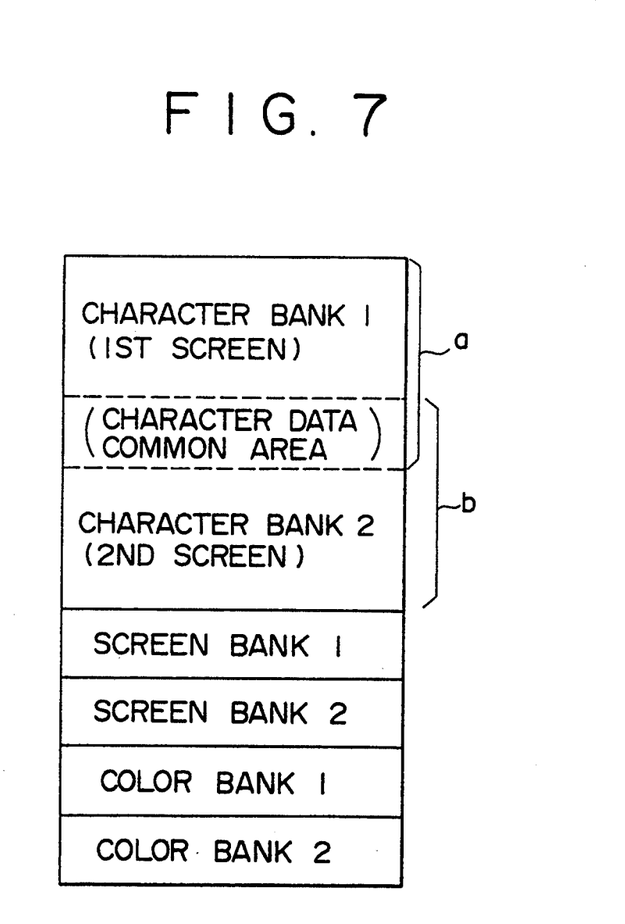

The circuit is so devised that image data of substantially two screens (practically less than two screens as will be described later) are stored in the RAMs 3, 4, 5 so that the images can be displayed continuously. According to this embodiment, it is possible to simultaneously perform both the operation of reading out the image data from the CD ROM device 2 and storing the same in the RAMs 3, 4, 5; and the operation of displaying, on the monitor 7 via the image display unit 6, the image data stored in the RAMs 3, 4, 5. In this embodiment, the RAMs 3, 4, 5 are so formed as to have a group of discrete memory areas including, as shown in FIG. 7, an area used as a character bank (RAM 5), an area as a screen bank (RAM 4), and an area as a color bank (RAM 3). The character bank for storing the character data is divided into a character bank 1, a character bank 2 and a character data common area. The character banks 1 and 2 for storage of predetermined character data respectively are capable of storing character data of one entire screen in combination with the character data common area. More specifically, the combined area $\underline{a}$ of the character bank 1 and the character data common area has a memory capacity sufficient to store the character data of substantially one screen; and the combined area $\underline{b}$ of the character bank 2 and the character data common area also has a memory capacity sufficient to store the character data of substantially one screen.

In this case, character data used at a relatively high frequency is stored in the character data common area. For example, there is stored such data that all of 64 pixels constituting one character are of the same color as white or black, or data of a pattern specific to an animation formed of such image. The character data used frequently are different depending on images and are preset individually in software composed of data of plural images. And under control of the CPU 1, the first image data of the software is read out from the disc (CD ROM) simultaneously with the other character and is stored in the character data common area. And the data representative of the image portion corresponding to the character data thus stored in the common area is added to the screen data so that the video signal to be displayed is produced in the image display unit 6 by identifying such screen data.

Figure 8:
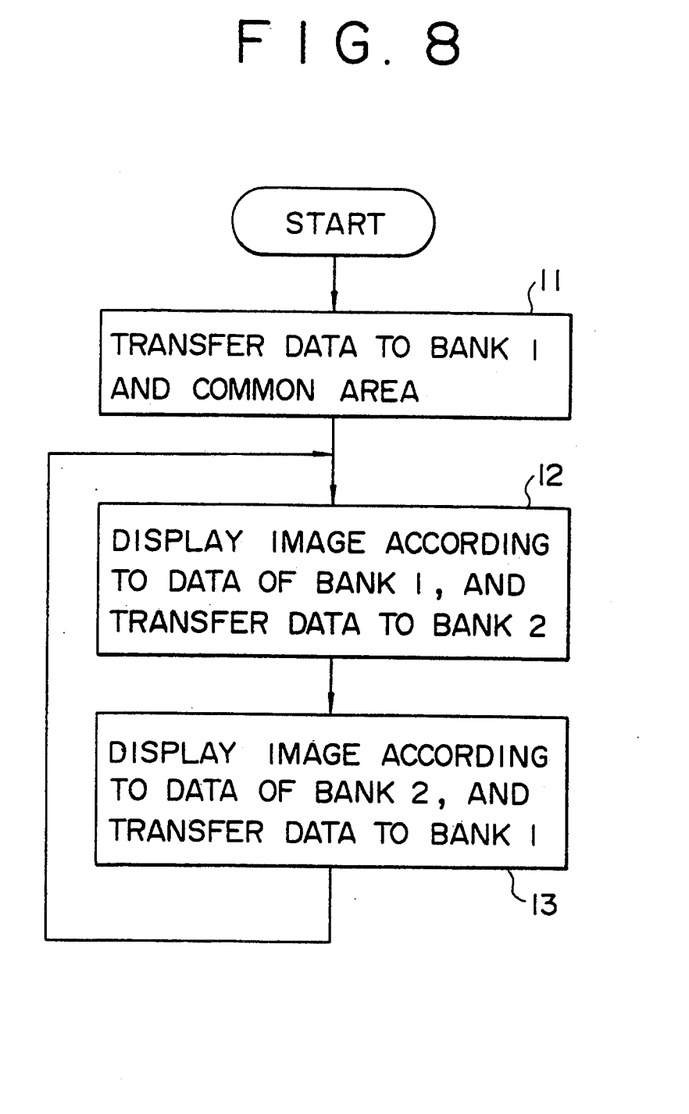
FIG. 8 is a flow chart for explaining the operation of the embodiment.

Referring now to a flow chart of FIG. 8, a description will be given below with regard to the control executed to display images continuously on the monitor 7 by using the RAMs 3, 4, 5. Initially when the first image data of the software is read out from the CD ROM, all of the palette data, screen data and character data constituting such image data are read out simultaneously with the common character data prepared in the same software, and then the data thus read out are transferred to and stored in the color bank 1, the screen bank 1, the character bank 1 and the character data common area respectively (step 11).

Upon termination of such data transfer, the video signal to be displayed is produced in the image display unit 6 in accordance with the relevant data and then is displayed on the monitor 7. In this case, any insufficiency of the character data in the character bank 1 is supplemented by the character data stored in the common area, whereby complete character data of one entire screen can be obtained.

During the period in which the first image is displayed on the monitor, the image data to be displayed next is read out from the CD ROM simultaneously therewith. In this operation, all of the palette data, screen data and character data constituting the second image data are read out and then are transferred to and stored in the color bank 2, the screen bank 2 and the character bank 2 respectively (step 12). In this case, none of new data needs to be transferred to the common area.

Upon arrival of the timing to display the second image, the video signal to be displayed is produced in the image display unit 6 in accordance with the data stored in the banks 2, and such video signal displayed on the monitor 7. In this case also, any insufficiency of the character data in the character bank 2 is supplemented by the character data stored in the common area, whereby complete character data of one entire screen can be obtained.

During the period in which the second image is displayed, the image data to be displayed next is read out simultaneously therewith from the CD ROM. In this operation, all of the palette data, screen data and character data constituting such next image data are read out and then are transferred to and stored in the color bank 1, the screen bank 1 and the character bank 1 respectively (step 13). In this case also, none of new data needs to be transferred to the common area.

Thereafter, similarly to the above, a subsequent image is displayed on the basis of the image data stored in one of the banks composed of the RAMs 3, 4, 5, and simultaneously the image data from the CD ROM is transferred to the other banks of the RAMs 3, 4, 5. Such operations are performed alternately to thereby achieve smooth switching of the displayed images.

According to the image data processing performed by the embodiment mentioned, any character data used at a relatively high frequency in the bit-map image data is rendered usable in common for the images displayed, hence reducing the amount of the whole data to be processed while further diminishing the required capacities of the RAMs 3, 4, 5 for temporarily storing the image data therein to execute the process for display. Thus, it becomes possible to reduce the data in software for animations or the like by an amount corresponding to the data usable in common, with another advantage of curtailing the memory capacity of the character bank by an amount equivalent to the character data common area, to thereby diminish the circuit scale of such memory.

Generally in displaying animations or the like, there exists a high correlation among individual images displayed continuously and many character data are usable in common, so that the requirement can be met by transferring merely partial character data to be changed at each time of switching the images, hence attaining a considerable reduction in the amount of the data to be processed.

If there occurs, during continuous display of images, a state where no correlation is existent at all between the images, then the data in the character data common area may be replaced with the data read out from the CD ROM or the like. It is further possible to set the capacity of the character data common area to be changeable in accordance with the software.

What is claimed is:

1. An image data processing apparatus wherein image data of a color image to be displayed on a screen are read out from an image data recording medium and are stored in memories, said color image being formed of a predetermined number of divided screen blocks each including a predetermined number of pixels, and the color image is displayed on a display means in accordance with the image data stored in said memories, said apparatus comprising:

means for reading out from said data recording medium common image data common to first and second successive color images and remaining image data of the divided screen blocks and storing the common image data and remaining image data in said memories; and means connected to said memories for successively displaying the first and second color images on said display means in accordance with the common image data and the remaining image data of the divided screen blocks, wherein the data recorded on said data recording medium include pixel numbers for designating relevant pixels that form the image of the divided screen blocks, and also color numbers for setting the colors of the pixels designated by said pixel numbers, and the image data of the divided screen blocks are read out from said data recording medium in conformity with the pixel numbers and the color numbers and then are stored in said memories; and further comprising means for storing in said memories palette data to designate an amount of red, green and blue color components corresponding to the color numbers and data indicative of the correspondence between the palette data and the color numbers usable in palettes designated by the palette data; and means for storing, in said memories, data indicative of the correspondence between the images of the divided screen blocks and the palette data, wherein the data indicative of the correspondence between the palette data and the color numbers usable in the palettes designated by the palette data, and the data indicative of the correspondence between the images of the divided screen blocks and the palette data, are both read out from said data recording medium and are stored in said memories.

2. The apparatus according to claim 1 further comprising means for storing in said memories the common image data for the first and second color images before storing in said memories the remaining image data of the divided screen blocks.

3. The apparatus according to claim 1 wherein said palette data are read out from said data recording medium and are stored in said memories.

4. The apparatus according to claim 1 wherein the data indicative of the correspondence between the palette numbers and the color numbers usable in the palettes designated by the palette numbers, and the data indicative of the correspondence between the images of the divided screen blocks and the palette numbers, are both read out from said data recording medium and are stored in said memories.

5. A method of processing image data of a color image which is to be displayed on a screen and is constituted of a predetermined number of divided blocks each composed of a predetermined number of pixels, the method comprising the steps of:

providing first, second and third data tables to display the colors of the individual pixels;

determining from said first data table the correspondence between the pixels of each of the divided blocks and the color data of the pixels;

determining from said second data table the correspondence between a plurality of palettes and the color dat usable in said palettes; and determining from said third data table the correspondence between the divided blocks and said palettes.

6. The method according to claim 5 comprising the steps of selecting the color data set in said second data table from the range of colors usable for the image displayed in one screen.

* * * * *